July 25, 1961   J. J. SICHMAN   2,993,710
SAFETY HOOK HITCH
Filed Nov. 9, 1960
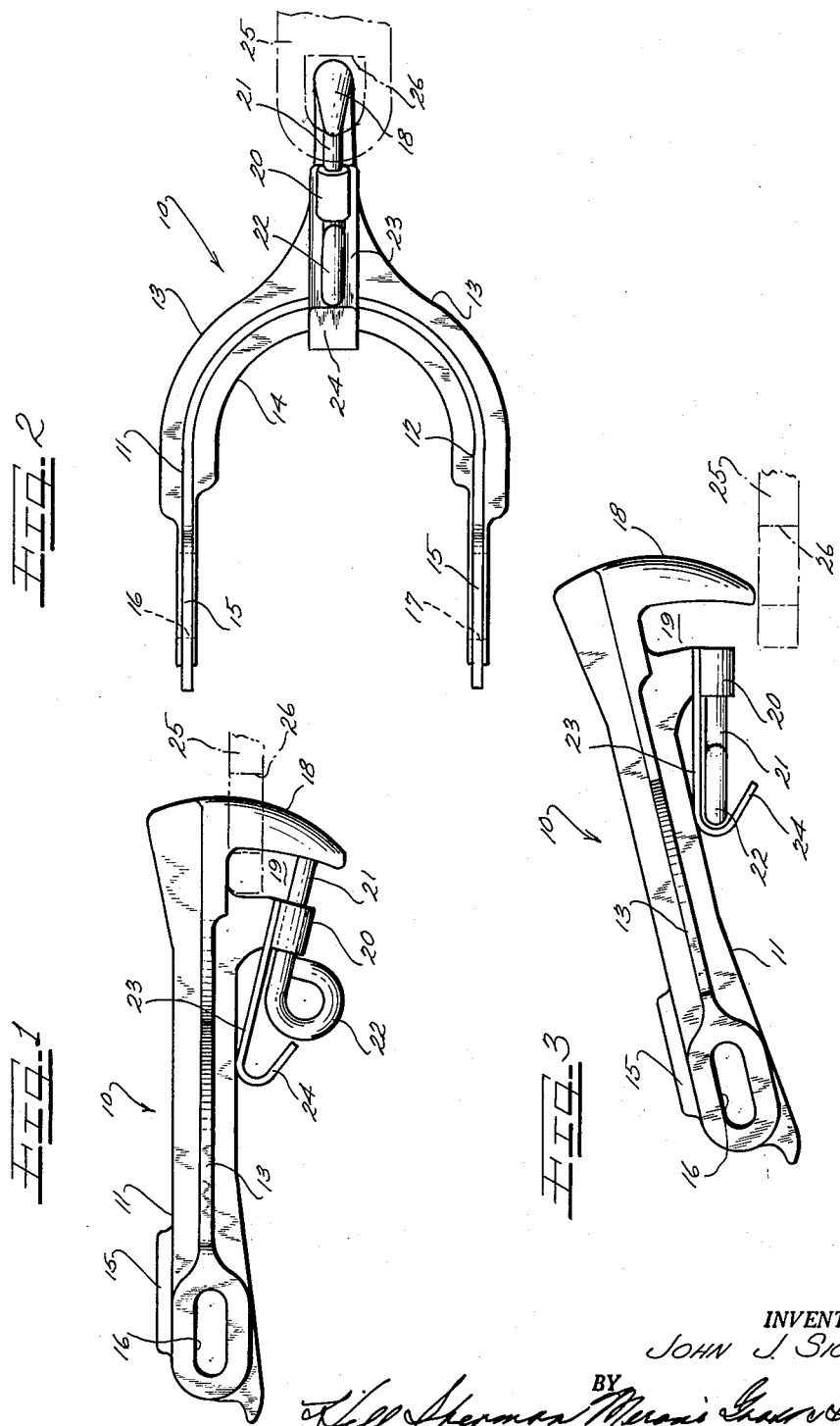
INVENTOR.
JOHN J. SICHMAN
BY
ATTORNEYS

United States Patent Office 2,993,710
Patented July 25, 1961

2,993,710
SAFETY HOOK HITCH
John J. Sichman, Chicago, Ill., assignor to Ward Sales & Engineering Co., Chicago, Ill., a copartnership
Filed Nov. 9, 1960, Ser. No. 68,305
1 Claim. (Cl. 280—504)

This invention relates to coupling devices and, more particularly, to a safety hook hitch for coupling vehicles together.

It is a primary object of this invention to provide a hook hitch for fastening two wheeled vehicles such as trailers together in a safe and simple manner.

It is another object of this invention to provide a hook hitch that is easily manipulated and does not require the use of tools to connect or disconnect it.

It is still another object of this invention to provide a hook hitch which is simple and durably constructed and which can be manufactured at a relatively low cost.

Other objects, features and advantages of the present invention will be more apparent from the following detailed description taken in conjunction with the accompanying figures of a drawing, in which:

FIGURE 1 is a view in elevation of a hook hitch constructed in accordance with the invention;

FIGURE 2 is a bottom plan view of the hook hitch illustrated in FIGURE 1; and

FIGURE 3 is another view of a portion of the hook hitch illustrated in FIGURE 1.

The hook hitch illustrated in the drawing includes a yoke-shaped member 10 that has two arms 11 and 12. These two arms are strengthened by ribs 13, 14 and 15 formed on them and they have elongated slots 16 and 17 so that the member 10 can be fastened to the frame of a vehicle such as a trailer by bolts or similar devices.

The yoke-shaped member 10 has a hook portion 18 formed thereon which defines a cavity 19. A tube or barrel 20 is also fastened to the member 10 by such means as welding and supports a circular rod 21. This rod 21 has a handle portion 22 which enables the rod 21 to be manually positioned in either the locked position illustrated in FIGURE 1 or the released position illustrated in FIGURE 3.

The rod 21 is prevented from being fully withdrawn from the tube 20 by a hook-shaped stop piece 23 that is fastened to the member 10 by such means as welding. The hook portion 24 of the piece 23 engages the handle 22 when this handle is in the downward position illustrated in FIGURE 1 and prevents the rod 21 from withdrawing out of the cavity 19. However, when the rod 21 is rotated approximately 90° in either direction the handle 22 is received in the hook portion 24 and the rod 21 can be withdrawn from the cavity 19 as illustrated in FIGURE 3.

The hook hitch illustrated in the drawing is adapted to couple with an eye hitch that is fastened to the frame of another vehicle. This eye hitch includes a plate member 25 that has a hole 26 formed in it that is adapted to receive the hook 18 of the member 10. When the member 10 is to be coupled to the eye hitch, the rod 21 is turned approximately 90° to the position illustrated in FIGURE 3 and the rod is withdrawn from the cavity 19 which allows the hook 18 to be inserted into the hole 26. The rod 21 is then either manually returned to the normal position illustrated in FIGURE 1, or may be simply released which allows the force of gravity to return the rod to this position. The stop piece 23 and the barrel 20 are fastened to the member 10 in such a manner that they slope downwardly and the hook portion 24 is set at an angle to encourage forward sliding and turning motion of the rod 21. The offset weight of the handle 22 also promotes this turning motion and the size and shape of this handle, as well as the angle of the hook portion 24, can be adjusted to obtain semiautomatic operation of the device. It can be seen that the hitch assembly is very versatile and is even adaptable to remote operation from the seat of a towing vehicle such as a tractor. The apparatus is also very safe when the rod 21 is in the locked position illustrated in FIGURE 1 because the hook portion 24 of the piece 23 prevents the rod 21 from withdrawing out of the cavity 19 until the handle 22 is deliberately rotated about its axis and withdrawn.

It can be seen that a hook hitch constructed in accordance with this invention possesses several advantages over those known in the prior art. This hook hitch is very simply and ruggedly constructed, economical to manufacture, and very easy to manipulate since it does not require other tools. Such a hook hitch is also very safe in operation since it cannot become accidentally disengaged because of the stop piece 23.

It will be apparent that modifications and variations may be effected without departing from the scope of the novel concepts of the present invention.

I claim as my invention:

A mechanism for releasably coupling two vehicles together comprising a member adapted to be attached to a first vehicle, a downwardly extending hook formed on said member which defines a cavity, said hook being adapted to fit into a hole formed in a plate member that is attached to a second vehicle, a hollow tube formed on said member which is angularly displaced relative to said member, a shaft slidably mounted within said tube, said shaft being slidable between a first position where it closes said cavity and a second position where it opens said cavity, a handle portion formed on said shaft which is offset relative to the axis of said shaft, a hook shaped stop formed on said member adjacent said handle portion of said shaft, said stop being adapted to butt against said handle portion of said shaft and prevent said shaft from accidently moving from said first position to said second position and adapted to receive said handle portion when said shaft is rotated about its axis, said shaft being encouraged to automatically slide from said second position to said first position by the weight of said offset handle portion formed on said shaft, the angular displacement of said tube, and the slope of said hook shaped stop.

References Cited in the file of this patent

UNITED STATES PATENTS

| | | |
|---|---|---|
| 1,353,094 | Trumpour | Sept. 14, 1920 |
| 1,650,767 | Odiorne | Nov. 29, 1927 |
| 2,392,368 | Dilbert | Jan. 8, 1946 |